United States Patent [19]
Allen et al.

[11] 3,715,128
[45] Feb. 6, 1973

[54] RETRACTABLE SUSPENSION AND RUNNING GEAR FOR TRAILERS

[76] Inventors: George W. Allen, 810 W. Limberlost Rd.; Charles S. Gray, 1127 E. 10th St., both of Tucson, Ariz. 85700

[22] Filed: Aug. 16, 1971

[21] Appl. No.: 171,927

[52] U.S. Cl.............280/43.22, 116/34, 280/124 A
[51] Int. Cl. ..............................................B62d 21/18
[58] Field of Search...280/43.18, 43 R, 43.27, 43.24, 280/124 A

[56] References Cited
UNITED STATES PATENTS

| | | | |
|---|---|---|---|
| 1,794,630 | 3/1931 | Linn | 280/43 |
| 1,840,599 | 1/1932 | Nibbe | 280/43.18 |
| 2,577,885 | 12/1951 | Gay | 280/43.23 |
| 3,462,171 | 8/1969 | Mitty | 280/43 |
| 2,052,309 | 8/1936 | Kovach | 280/124 A |
| 2,123,086 | 7/1938 | Leighton | 280/124 A |
| 2,093,822 | 9/1937 | Stump | 280/124 A |

*Primary Examiner*—Benjamin Hersh
*Assistant Examiner*—Robert R. Song
*Attorney*—Pike H. Sullivan

[57] ABSTRACT

A retractable suspension and running gear is provided which lends itself to easy mounting upon the side walls of existing road trailers. Firmly mounted on the side of the trailer are two pairs of steel angular bars, such pairs forming vertical spaced channels for receiving in slidable engagement therewith a steel plate which may be locked in various positions in its vertical channels. A lower portion of said plate carries a pair of swing arms the ends of which are pivoted thereto in spaced relationship to each other and the other ends of which are pivoted (also in spaced relationship) to a substantially vertically disposed part of the wheel assembly which receives the lower end of a coil spring suspension member. The upper portion of the slidable plate is provided with means for receiving and securing the upper end of said spring member. The upper part of the steel channel assembly is provided with a suitable ledge against which a jack or other means may bear when downward force is applied to said spring receiving means on said slidable plate in order to move said plate into the designed vertical position. Locking means is provided to hold the slidable plate in such desired position. An indicator of proper tire pressure is actuated by one of the swing arms.

4 Claims, 6 Drawing Figures

GEORGE W. ALLEN
CHARLES S. GRAY   INVENTORS

PATENTED FEB 6 1973
3,715,128
SHEET 2 OF 2
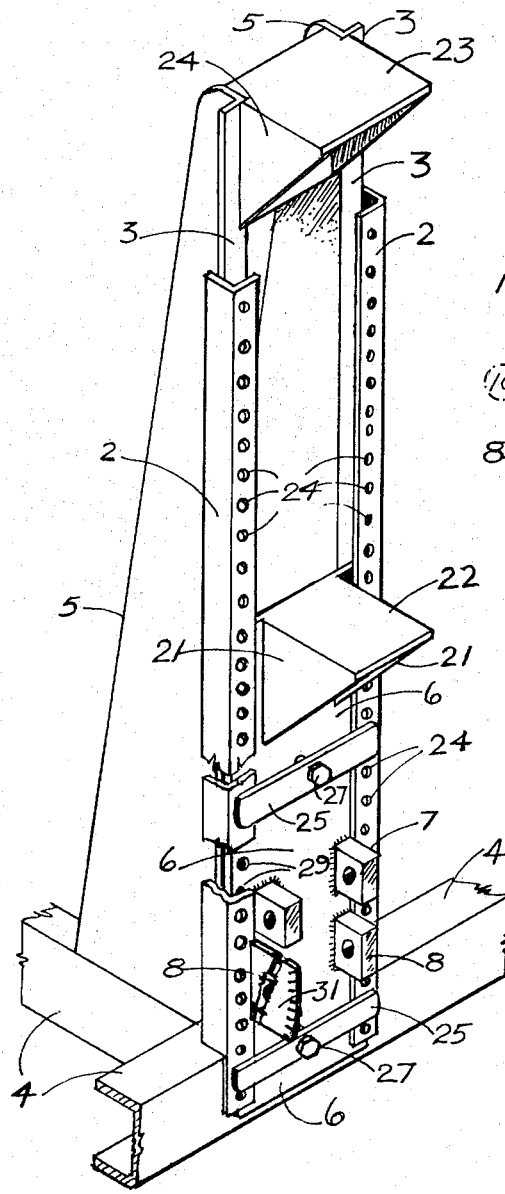
FIG. 3
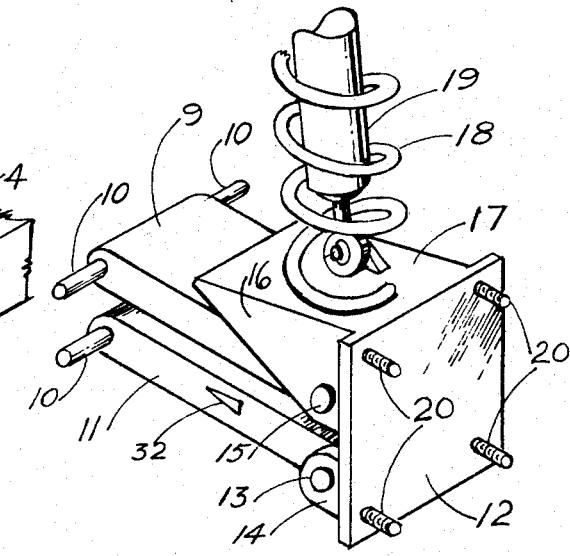
FIG. 5
FIG. 4
GEORGE W. ALLEN
CHARLES S. GRAY INVENTORS
BY Pike H. Sullivan
Their Attorney

RETRACTABLE SUSPENSION AND RUNNING GEAR FOR TRAILERS

This invention relates to an improved wheel suspension for trailers which is adapted to be easily applied to existing trailers.

It is an object of the present invention to provide a suspension mechanism which permits the trailer to be lowered so as to rest upon the ground for easy loading and unloading and also to serve as a temporary storage facility.

Another object is to provide a suspension system which is subject to ready adjustment so as to compensate for an unequal distribution of weight in the trailer load in order that the trailer may stand in a substantially vertical position.

Another object is to provide a swing arm type suspension which maintains a substantially constant camber of the wheels during vertical motion incident to road shock, turns, etc.

Another object is to provide an indicator, actuated by one of the swing arms, which shows the amount of air pressure required for the tire on the wheel associated with such swing arm because of the amount of the load on such tire.

The above and other objects, features and advantages of this invention will be fully understood from the following description considered in connection with the accompanying illustrative drawings.

In the drawings:

FIG. 3 is an isometric view of apparatus which is secured to the trailer and to which is attached the supporting mechanism for the wheel.

FIG. 4 is an isometric view of the swing arm assembly which carries a wheel of the trailer.

FIG. 5 is an elevational view showing the swing arms and the tire pressure indicator.

Figure 6:
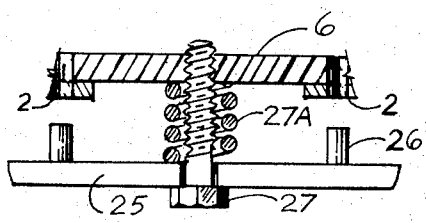
FIG. 6 is a sectional view of an arm for locking the suspension mechanism in the desired position.

Referring more specifically to the drawings, 1 indicates approximately one-half of a road trailer the side of which is fitted with the suspension system of the present invention and which is not shown in detail in this figure. Referring now to FIGS. 3 and 4, a pair of right angle steel members 2 are vertically mounted in parallel on the side wall of the trailer 1. They are welded or otherwise secured to vertical angular members 3 which in turn are firmly secured to the steel frame members 4 of the trailer, and are reinforced by a pair of gusset plates 5 which are secured to the trailer frame. To avoid the gusset plates 5 protruding into the trailer, the assembly may be suitably altered so as to permit the gusset plates to extend away from the wall of the trailer. The angular steel members 2 face each other so as to form, in association with the front faces of angular members 3, a pair of parallel vertical channels which receive in a slidable relationship a steel plate 6. The outer face of the lower portion of slidable plate 6 carries two pair of pillow blocks 7 and 8. The upper swing arm 9 is pivotably secured to the pillow blocks 7 by a pin 10 which extends through holes formed in such blocks, and the lower swing arm 11 is similarly pivotably secured to blocks 8 by the engagement of a similar pin 10 with holes in blocks 8.

The other ends of the swing arms 9 and 11 are pivotably secured to a flange plate 12, the lower arm 11 having a pin 13 which engages holes in pillow block 14, and the upper arm having a pin 15 which engages holes in an angular shaped plate 16. The swing arms 9 and 11 are of equal length and therefore are always in parallel relationship, their points of pivot in the pillow blocks 7 and 8 being in the same vertical plane.

The flange plate 12 carries at its upper portion a plate 17 which is secured to plate 16 and a similar angular plate (not shown) so as to provide a receiver for compression coil spring 18 and shock absorber 19, which is surrounded by the spring 18. The flange plate 12 is provided with suitable stud bolts 20 for securing thereto the wheel 30 and its axle assembly. The upper portion of slidable plate 6 carries a receiver for the coil 18 and shock absorber 19. This comprises a pair of spaced angular plates 21, an upper horizontally disposed flat plate 22. Under such plate 22 there is provided a conventional receiver (not shown) for the shock absorber 19 and spring 18.

On the upper end of the main support members 3 there is mounted a horizontal plate 23 which is secured by angular plates 24 to said members 3. The outer faces of the angular members 2 are provided with a series of spaced holes 24. The slidable plate 6 carries one or more arms 25 which, on their inner sides and adjacent their ends, are provided with pins 26 which may be engaged with various of the holes 24, and secured in such engagement by tightening of the bolt 27, which has threaded engagement with the slidable plate 6, thereby firmly securing the plate 6 and preventing any movement thereof. The outer portions of the face of slidable plate 6, which portions engage the channel forming members 2 are provided with a series of spaced holes 29 (FIG. 3) which may be engaged by the pins 26 when extended through the holes 24, thus further locking the plate 6 in immovable relationship with the channel members 2.

A compression spring 27A may be carried by the bolt 27 and interposed between plate 6 and arms 25 so that the arms may be forced outward when the bolt 27 is loosened thereby keeping the pins from engaging the holes 24 and 29.

Figure 1:
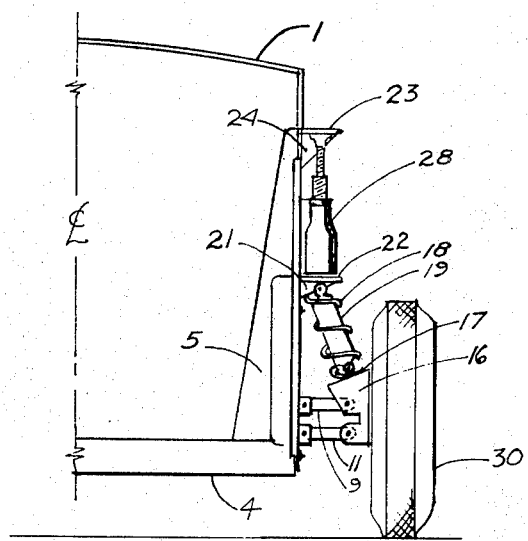
FIG. 1 is a cross section of one-half of a trailer and taken on a line adjacent the suspension mechanism.
Figure 2:
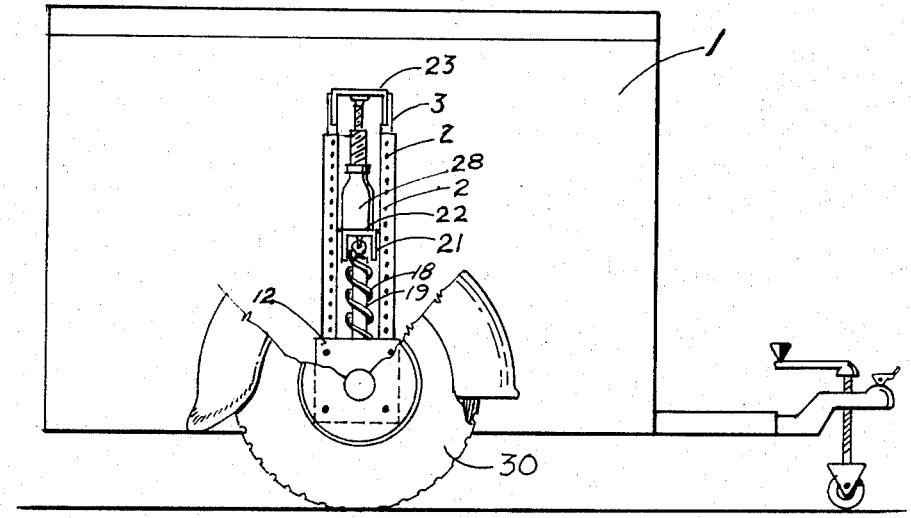
FIG. 2 is a side elevation view of the trailer partly broken away to show certain details at the suspension mechanism.

The plates 22 and 23 are adapted to receive between them an electrically operated screw jack 28 (FIGS. 1 and 2). By means of the jack, and with the pins 26 disengaged from the holes 24 and 29 the plate 22 may be moved vertically relative to plate 23 and the channel support members 2, thus causing the slidable plate 6 to move upward or downward relative to members 2 and the body of the trailer 1. It will be understood that because a substantial part of the weight of the trailer 1 is supported by plate 6 it will, except as restrained by the jack 28, move upward. In normal use on roadways, the position of the plate 6 is such as to cause the trailer body to have normal road clearance as shown in FIGS. 1 and 2. (It is to be understood, of course, that the other half of trailer 1 is provided with an identical suspension system). For convenience in loading or unloading, or for using the trailer as a storage facility, the plates 6 on both sides of the trailer will be allowed, by retracting the jack, to rise sufficiently so as to cause the bottom of the trailer body to rest firmly on the ground. If desired substantially all the weight of the trailer can be taken off the wheels 30 thus facilitating changes of tires or other maintenance operations.

If the weight distribution of the cargo in the trailer is uneven, the jacks 28 may be operated to adjust the position of plates 6 so that the trailer will stand in a substantially vertical position. It will be understood that our suspension system also can be employed as a guide to loading the trailer evenly.

It will be appreciated that the attitude of the swing arms 9 and 11 will vary in accordance with the gross weight of the trailer. In FIG. 1 they are substantially horizontal, the weight of the trailer being normal. A lesser weight will result in the spring 18 causing the swing arms to pivot downwardly on their pins 10. Conversely, a greater weight will result in the spring 18 being compressed so as to cause the swing arms to pivot upwardly on their pins 10. It is desirable that the air pressure in the tires should be adjusted in accordance with the load on them. In accordance with our invention we utilize the position of a swing arm to provide an indication of the proper tire pressure for any given load condition. As shown in FIG. 5, an arced scale 31 (calibrated in pounds per square inch) is secured to the outer end of pillow block 8 so as to be free of contact with swing arm 11 or 9. On the outer side of swing arm 11 there is mounted an arrow-head type pointer 32. The scale 31 is also calibrated so that the number thereon which the pointer 32 designates will be the proper tire pressure in pounds per square inch. Thus, the greater the weight of the trailer the greater will be the indicated pressure, as the swing arm will rise relative to the scale 31, and, conversely, the arm will descend with less weight and thus indicate a lower tire pressure requirement.

The screw jacks 28 are adapted to operate on electricity supplied by the vehicle towing the trailer. It is to be understood that another type of mechanism may be employed in place of the jacks 28 to exert the required force between the plates 22 and 23 to effect the desired positioning of plate 6 and to maintain it in such position until the plate is firmly locked in position by the pins 26 on arm 25.

We claim:

1. A vertically adjustable suspension and running gear for trailers comprising a pair of members adapted to be firmly mounted on a trailer side wall and providing two horizontally spaced vertical channels which open toward each other, an elongated plate slidably engaging said channels, a pair of swing arms pivotally attached at one of their ends to the lower portion of said plate and in vertically spaced and substantially vertically aligned relation to each other, said arms being of substantially equal length and pivotally attached at their other ends to a wheel carrying member, a coil spring receiving means carried by the upper portion of said sliding plate, a coil compression spring interposed between said wheel carrying member and said spring receiving means, means carried by the upper portion of said channel forming members and adapted to serve as an anchor for a means to apply a downward force against said slidable plate, and means for locking the sliding plate in a desired position.

2. The invention of claim 1 wherein the outer face of at least one of the two channel forming members is provided with a series of vertically spaced holes, and means carried by said sliding plate for selectively engaging said holes whereby said plate is secured in a desired vertical position.

3. The invention of claim 1, wherein a dial bearing tire pressure indicia is secured to the wall assembly of the vehicle at a point near that at which one of said swing arms is pivotally attached to said slidable plate, said swing arm being provided with a pointer to indicate the pressure indicia on said dial in response to the gross weight of the trailer at the time in question.

4. The invention of claim 3 wherein said dial is attached to said sliding plate near the aforesaid pivot point.

* * * * *